United States Patent
Hino

[19]
[11] Patent Number: 5,987,770
[45] Date of Patent: Nov. 23, 1999

[54] STEAM RECOMPRESSION TYPE VACUUM DRYING APPARATUS

[75] Inventor: Toshiyuki Hino, Chofu, Japan

[73] Assignee: Kajima Corporation, Tokyo, Japan

[21] Appl. No.: 08/849,516

[22] PCT Filed: Oct. 30, 1996

[86] PCT No.: PCT/JP96/03177

§ 371 Date: Jul. 21, 1997

§ 102(e) Date: Jul. 21, 1997

[87] PCT Pub. No.: WO97/16689

PCT Pub. Date: May 9, 1997

[30] Foreign Application Priority Data

Oct. 31, 1995 [JP] Japan ..................... 7-282750
Sep. 30, 1996 [JP] Japan ..................... 8-258183
Sep. 30, 1996 [JP] Japan ..................... 8-258184

[51] Int. Cl.[6] ..................... F26B 5/04
[52] U.S. Cl. ..................... 34/92; 34/408
[58] Field of Search ..................... 34/72, 73, 74, 34/75, 76, 77, 86, 92, 402, 403, 407, 408, 361, 477, 514, 515; 159/16.3, 24.1, 47.3, 159, DIG. 16; 202/186; 203/24, 26, 49, 87

[56] References Cited

U.S. PATENT DOCUMENTS

| | | | |
|---|---|---|---|
| 4,209,911 | 7/1980 | Weber | 34/354 |
| 4,653,198 | 3/1987 | Alsaker | 34/515 |
| 5,636,449 | 6/1997 | Gaddis et al. | 34/124 |
| 5,819,436 | 10/1998 | Helevirta | 34/408 |

*Primary Examiner*—Henry Bennett
*Assistant Examiner*—Pamela A. Wilson
*Attorney, Agent, or Firm*—Smith, Gambrell & Russell; Beveridge, DeGrandi, Weilacher & Young

[57] ABSTRACT

A steam re-compression vacuum dryer includes a vacuum tank for accommodating waste; a first steam duct for removing steam from the vacuum tank; a steam compressor for compressing steam removed from the vacuum tank via the first steam duct and for producing a vacuum pressure in the vacuum tank; a steam condenser disposed in and/or thermally coupled to the vacuum tank; a non-condensing gas exhausting device for automatically exhausting non-condensing gas from the steam condenser; and a condensation water exhausting device for automatically exhausting condensation water from the steam condenser. If desired, a gas heater can be provided on the first steam duct to heat gas withdrawn from the tank through this duct. This gas heater may use steam discharged from the steam compressor as a heat source. The steam condensing device can be disposed in the vacuum tank, or it can be integral with an outer surface of the vacuum tank (e.g., the tank wall may have a double wall construction).

13 Claims, 10 Drawing Sheets

STEAM RECOMPRESSION TYPE VACUUM DRYING APPARATUS

BACKGROUND OF THE INVENTION

1. Field of the Invention

This invention relates to steam re-compression vacuum dryers used for dehydrating and drying water-containing wastes, such as rubbish, waste fish, mud, etc. and also used for concentrating liquid wastes. More particularly, the present invention relates to a steam re-compression vacuum dryer, which comprises a vacuum tank for accommodating a waste, a compressing means for compressing steam from the vacuum tank, a steam condensing means thermally coupled thereto, and exhausting means for exhausting condensation water and non-condensing gas.

2. Description of the Prior Art

Wastes containing great amounts of water, such as organic wastes and mud, which could not heretofore have been burned and are readily spoiled, require a great deal of labor for their disposal. In addition, liquid wastes produced as a result of plating, photography, etc., are discharged in the ocean because their disposal is difficult. However, there is a trend for prohibiting such discharging in our country and also internationally.

Combustible wastes with even great water contents, however, can be burned with a slight amount of combustion promoter when their water content is reduced by evaporation. In addition, self-burning wastes can be used as a source of energy. Organic wastes can be readily converted into composts. Liquid wastes permit transportation cost reduction and are capable of recovering resources.

The evaporation of water content, however, requires application of heat corresponding to the high latent heat of water evaporation (2,257 kJ/kg at 100° C.), thus requiring enormous heat energy.

Heretofore, techniques of drying water-containing wastes by vacuum evacuation have been used. In these techniques, a gas-tight vessel accommodating a waste is evacuated using a vacuum pump and, at the same time, heated with hot water or steam from a boiler, thus evaporating the water content. Steam being generated in this way is condensed by cooling water from a cooling tower and drained by using a water sealed vacuum pump.

By causing pressure reduction to below the atmospheric pressure, the boiling point of water is reduced from 100° C. Therefore, the waste can be quickly dried while preventing a bad smell dispersion. In addition, wastes containing combustible materials such as alcohols can be safely dried.

However, the latent heat of the water evaporation is not reduced by evacuation. Rather, a boiling point reduction slightly increases the latent heat of evaporation (for instance to 2,383 kJ/kg at 50° C.). Therefore, the heat energy required for drying cannot be reduced by evacuation.

As techniques for reducing heat energy required for evaporation, those of multiple stage flashing and steam re-compression are well known in the art. In either case, steam generated by evaporation is compressed and condensed (i.e., liquified) in a heat exchanger, and the latent heat of condensation generated at this time is used to evaporate water. Theoretically, these processes permit high energy efficiency to be obtained.

Particularly, since the steam re-compression process uses a relatively simple construction and permits efficient operation by electric power, it is used for concentrating liquid wastes. As the equipment, however, a large scale apparatus (of several 10 kW or above) is mainly used, which uses a centrifugal compressor. In addition, auxiliary devices such as a vacuum pump for air extraction and a draining pump are necessary, thus, complicating the equipment and increasing the cost thereof.

In applications, the process is used mostly for concentrating liquid wastes.

As a further technique, a vacuum evaporator, which is based on the principle of the heat pump and satisfactory in energy efficiency, is used in practice. In this case, a gas-tight vessel accommodating a waste is evacuated by using a water ejector or a vacuum pump, latent heat of condensation of steam is absorbed (with a refrigerant absorber) by using a heat pump based on such coolant as "HCFC-22" (chlorofluoro hydrocarbon), and latent heat of evaporation is given to the water (with the refrigerant condenser).

An advantage of this technique is that existing refrigerant (heat pump) parts can be used. However, it is possible that the lubricating oil will thermally be decomposed. Therefore, the cooling temperature cannot be made so high (only up to 60° C. to 70° C.). In addition, a heat exchanger between water and coolant is necessary, and the estimated coefficient of performance (which is the quotient of division of applied heat by electric input) is 3 to 5. The steam re-compression process permits a high heating temperature to be obtained and also permits a coefficient of performance of 10 or above to be readily obtained.

An object of the invention is to provide a steam re-compression vacuum dryer, which is based on the principle of steam re-compression, is small in size, is convenient to handle and is highly efficient in energy efficiency.

SUMMARY OF THE INVENTION

The steam re-compression vacuum dryer according to the present invention comprises a vacuum tank for accommodating a waste, a steam compressor for compressing steam from the vacuum tank, a steam condenser disposed in and thermally coupled to the vacuum tank, non-condensing gas exhausting means for automatically exhausting non-condensing gas from the steam condenser, and condensation water exhausting means for automatically exhausting condensation water from the steam condenser.

The above vacuum dryer further comprises compressor temperature preserving means for maintaining (holding) the steam compressor at a predetermined temperature.

The above vacuum dryer still further comprises steam exhausting means for exhausting steam from a duct to the outside for lowering the temperature.

The above-mentioned steam re-compression vacuum dryer further comprises flash steam returning means coupled to said condensation water exhausting means, for separating flash steam and returning the same to the vacuum tank.

With the above-mentioned constitution according to the present invention, air is first exhausted from the vacuum tank, in which the water-containing waste is contained, by the steam compressor, and the discharged gas being discharged from the steam compressor heats the waste in the vacuum tank in passing through the steam condenser and is exhausted by the non-condensing gas exhausting means.

Since the waste is heated in the vacuum tank while the pressure therein is reduced, water is evaporated, the steam thus is increased in pressure in the steam compressor and condensed in the steam condenser, and then, the condensation water thus generated is drained through the condensation water draining means.

The waste in the vacuum tank is further heated by the heat of condensation generated in the steam condenser.

In the present invention, in the case where the compressor temperature preserving means for maintaining (holding) the steam compressor at a predetermined temperature is provided, the steam compressor can be maintained (held) at a predetermined temperature by the compressor temperature preserving means, in which, for instance, steam being partly liquified in the steam condenser is used.

In the case where the steam exhausting means for exhausting steam from the steam duct and for lowering the temperature is provided in the present invention, when the system is overheated, steam can be partly exhausted to lower the temperature.

In the case where the vacuum dryer according to the present invention further comprises flash steam returning means, which is coupled to the condensation water exhausting means, the flash steam returning means separates flash steam and returns the same to the vacuum tank, and flash steam generated from the condensation water exhausted from the condensation water exhausting means can be returned to the vacuum tank by the flash steam returning means, for heat recovery, so that the efficiency of evaporation in the vacuum tank can be improved.

The re-compressed steam is often saturated, and as it passes through the suction duct of the steam compressor, it may be cooled off and then be partly liquified into fine particles, which may be evaporated when sucked into the steam compressor, so that the volume efficiency thereof may be aggravated (become worse).

To cope with this, according to the present invention, a steam recompression vacuum dryer is provided, which comprises a vacuum tank for accommodating a waste, a steam compressor for compressing steam from the vacuum tank, a steam condenser being disposed therein and thermally coupled to the vacuum tank, non-condensing gas exhausting means for exhausting non-condensing gas from the steam condenser, condensation water exhausting means for automatically exhausting condensation water from the steam condenser, and a sucked gas heater provided on a suction duct of the steam compressor for heating the sucked gas.

When sucked gas is heated by the sucked gas heater, steam, which may be super-heated, is not partly liquified while it passes through the suction duct. It is thus not possible that any condensation water entering the steam compressor is evaporated again and aggravates the volume efficiency thereof. This enables maintaining the volume efficiency of the steam compressor and reducing the size and weight of the vacuum dryer.

According to the present invention, it is suitable that the sucked gas heater is an electric heater provided on the suction duct. Alternatively, it is suitable that the sucked gas heater is a heat exchanger being provided on the suction duct and using steam discharged from the steam compressor as a heat source.

In the case where waste in a vacuum tank is heated by using the steam re-compression technique, when the temperature becomes higher, the generation of steam is more vigorous and the specific weight of steam is higher, so that even a small size compressor can exhibit high drying capacity. This fact means that, with a boiling point of, for instance, 50° C. or below, the degree of vacuum is high, and the specific weight of steam is low, and that, a large discharging volume of compressor, and hence a large compressor, is necessary, so that it is difficult to realize an economical system. By increasing the boiling point to, for instance, 75° C. or above, the necessary compressor capacity can be reduced, and also, it is possible to exterminate bacteria.

Under the principles of the steam re-compression, the present invention seeks to provide a steam re-compression vacuum dryer, which uses steam as a heat source and is small in size, convenient to handle and high in energy efficiency. Specifically, the present invention features a steam re-compression vacuum dryer, which comprises a vacuum tank for accommodating a waste, compressing means for compressing steam from the vacuum tank, steam condensing means thermally coupled to the vacuum tank, exhausting means for exhausting condensation water and non-condensing gas, and steam generating means disposed outside the vacuum tank, the discharge side of the steam generating means being connected to the vacuum tank.

Alternatively, the present invention features a steam re-compression vacuum dryer, which comprises a vacuum tank for accommodating a waste, compressing means for compressing steam from the vacuum tank, steam condensing means thermally coupled to the vacuum tank, exhausting means for exhausting condensation water and non-condensing gas, and steam generating means disposed outside the vacuum tank, the discharge side of the steam generating means being connected together with the discharge side of the compressing means to the steam condensing means, the outlet side of the steam condensing means being connected to the exhausting means.

With either of the above constitutions according to the present invention, the waste can be efficiently preheated either directly or indirectly by steam generated by the steam generating means, for instance a steam boiler. It is thus possible to reduce the necessary capacity of the compressor to reduce the size of the entire vacuum dryer. Further, since very simple preheating can be obtained, the cost of the entire vacuum dryer can be decreased.

According to the present invention, the steam condenser may be disposed in the vacuum tank, and also, it is possible to provide the condenser to be integral with the outer surface of the vacuum tank and provide a stirrer in the vacuum tank. With the provision of the stirrer, wastes requiring stirring, for instance, a highly viscous waste containing solid matter can be satisfactorily processed.

According to the present invention, it is suitable that the vacuum tank constitutes a double-wall type condenser, and a stirrer is disposed in the vacuum tank. With this construction rubbish or like waste can be readily stirred, while also providing for uniform and quick temperature rise.

Moreover, according to the present invention, it is suitable to supply the condensation water to the steam generating means.

DETAILED DESCRIPTION OF THE PREFERRED EMBODIMENTS

Preferred embodiments of the present invention will now be described with reference to the drawings.

Figure 1:
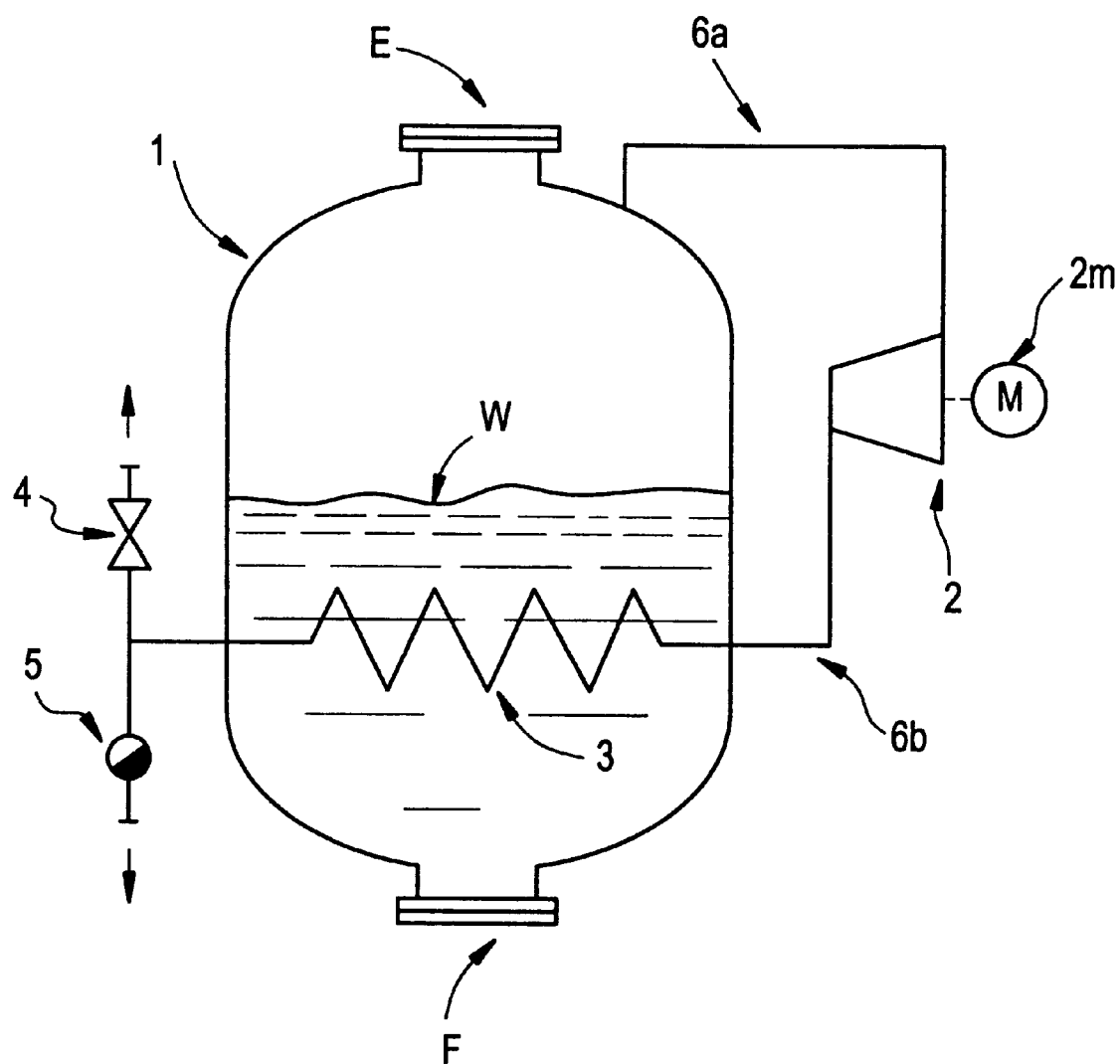
FIG. 1 is a schematic view showing the constitution of an embodiment of the present invention.

FIG. 1 shows an embodiment of the present invention. The illustrated embodiment comprises a vacuum tank 1 for accommodating a waste W, a steam compressor 2 for compressing steam, a steam condenser 3 disposed in the vacuum tank 1, a relief valve 4 as non-condensing gas exhausting means for automatically exhausting air and like non-condensing gases without use of a gas extraction pump or vacuum pump, and a steam trap 5 as condensation water exhausting means for automatically exhausting condensation water without use of any pump. The vacuum tank 1 is connected via a low pressure steam duct 6a to the steam compressor 2, which is in turn connected via a high pressure steam duct 6b to the steam condenser 3. Two branch ducts are led from the steam condenser 3, one being led via the relief valve 4 to a non-condensing gas exhausting port, the other being led via the steam trap 5 to a condensation water exhausting port. The vacuum tank 1 has a waste inlet opening E and a waste outlet opening F, and it desirably has a mechanical strength to withstand vacuum and is heat insulated from the outside. The steam compressor 2 is an oil-free volume compressor, for instance of oscillating type, reciprocating type, screw type, route type, rotary type, etc., having the function of a vacuum pump and not using any cylinder lubricant oil. Reference symbol 2m designates a compressor drive motor. The steam condenser 3 is thermally coupled to the vacuum tank 1 for heat exchange with the waste W in the tank, and it may be of coil type or constituted by a double-wall part of the tank 1.

In operation, a water-containing waste W is charged into the vacuum tank 1, and then the tank 1 is made gas tight by closing its lid. Then, the steam compressor 2 starts removing air and reducing the pressure in the tank 1. With the tank pressure reduction, discharge air from the steam compressor 2 is elevated in temperature and heats the waste W as it passes through the steam condenser 3. Since air is not condensible, the discharge pressure is increased. When the discharge pressure exceeds a predetermined pressure, for instance 1.5 atm. (152 kPa), the relief valve 4 is opened to exhaust air. Air in the vacuum tank 1 is thus purged to reduce the pressure therein.

When the steam compressor 2 has high evacuating performance, it can boil water even at normal temperature. For example, water is boiled when the pressure in the tank 1 is reduced down to 3 kPa at 25° C. With the increase in temperature of the discharge air noted above, the temperature of the waste W is increased, so that it is expected that boiling of water is more readily brought about (for instance under 7 kPa at 40° C.). Steam thus generated by evaporation is condensed in the steam condenser 3 and heats the waste W. Water generated by the condensation is drained through the steam trap 5. As the operation is continued in this way, the temperature in the vacuum tank 1 is gradually increased, and a rated operating state is reached. The phrase "rated operating state" means a state which corresponds to 90° C. and 70 kPa of the tank 1, for instance, and 110° C. and 143 kPa of the steam condenser 3, for instance.

Since the condensation pressure is higher than the atmospheric pressure (101 kPa), non-condensible gas, mainly composed of air, is exhausted through the valve 4.

Figure 2:
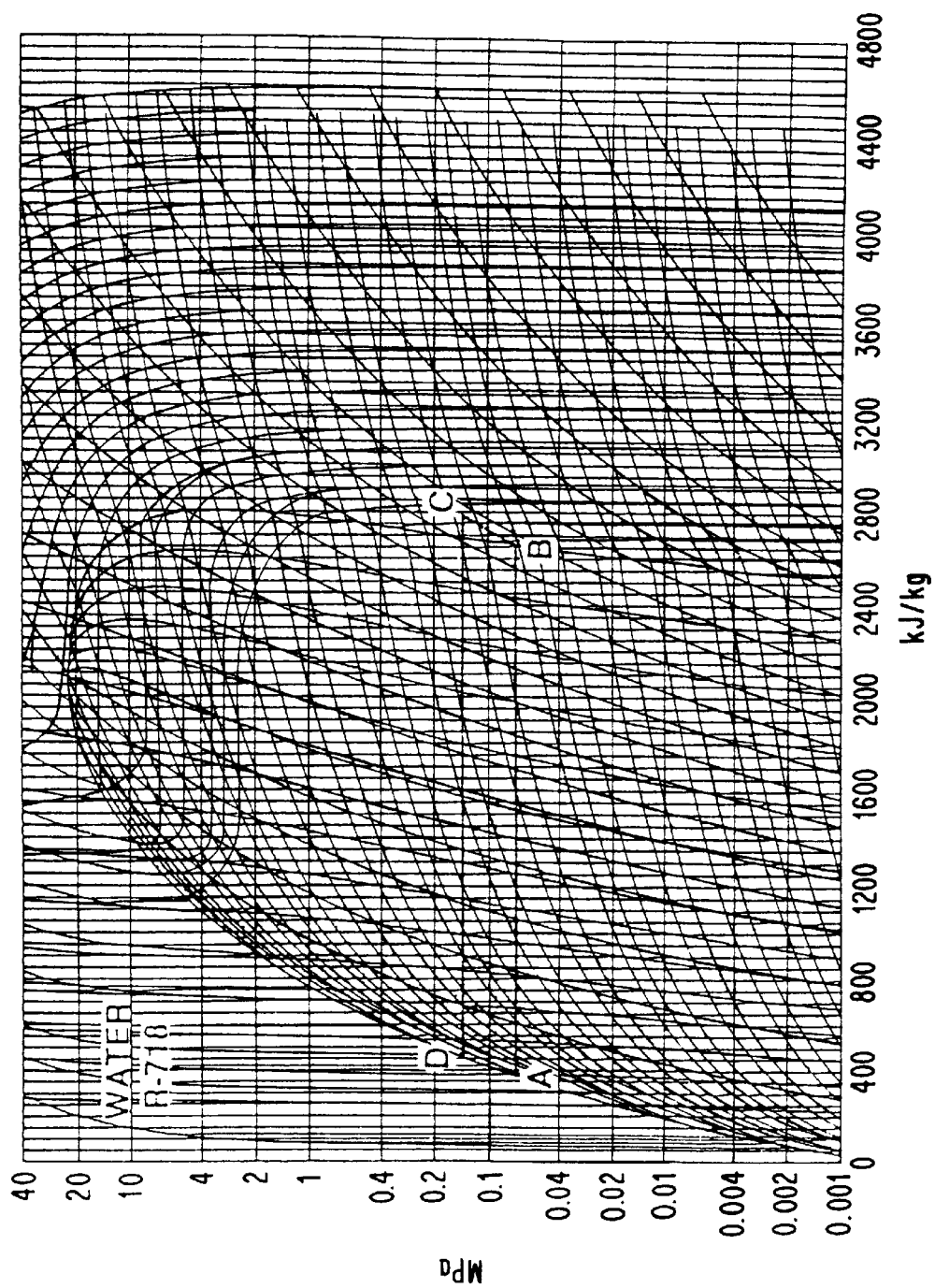
FIG. 2 is a graph showing the relation between water pressure and enthalpy for explaining the operation according to the present invention.

The operating state at this time will now be described with reference to a well-known pressure enthalpy graph shown in FIG. 2. In the graph of FIG. 2, the ordinate is taken for the pressure of $H_2O$, and the abscissa is taken for the enthalpy. The water in the waste W commences to be evaporated when a state represented by point A is reached, and completely becomes steam at point B. This steam is compressed in the steam compressor 2 to bring about a state shown by point C. In this state, the steam is super-heated. The steam under the increased pressure and at the increased temperature, is led to the steam condenser 3 for complete liquifaction, thus reaching point D.

FIG. 2 assumes an ideal situation free from pressure loss, and in which steam is iso-entropically compressed in the steam compressor 2. The actual compression process, however, is polytropic compression, and a tubing pressure loss is generated. However, high heat of evaporation can be given from point A to point B with low input (electric power) from point B to point C, and it will be seen that very high energy efficiency is obtainable. With water evaporation caused in the vacuum tank 1 in the above way, the waste W is dried, and concentrated in the case where it is a liquid waste.

Figure 3:
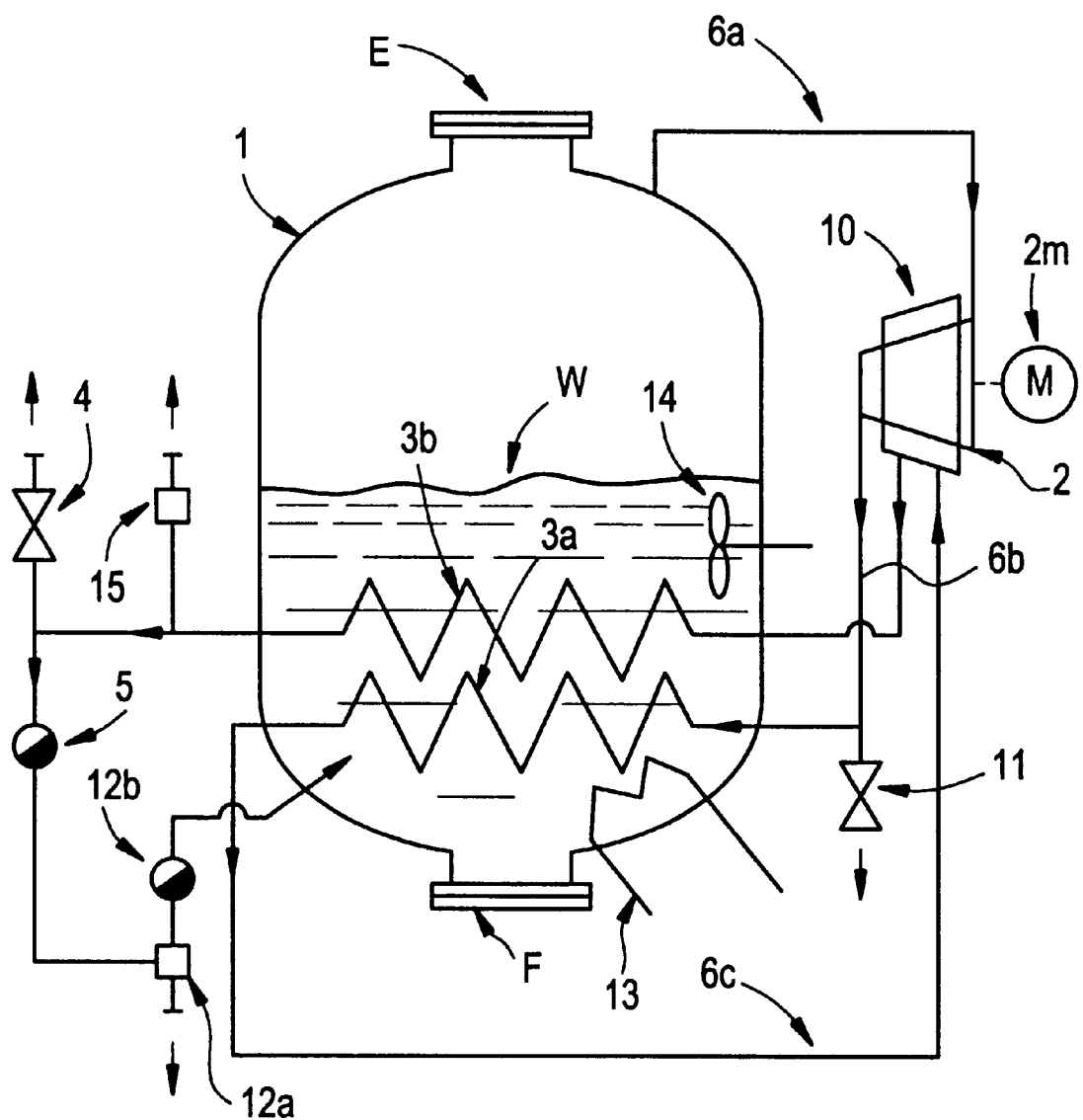
FIG. 3 is a schematic view showing the constitution of a different embodiment of the present invention.

FIG. 3 shows a different embodiment of the present invention, in which function improving means is added to the embodiment shown in FIG. 1.

Specifically, in the vacuum tank 1, compressor temperature preserving means is provided, which includes two condensers, i.e., a first and a second condenser 3a and 3b. The steam compressor 2 is connected via a first high pressure side steam duct 6b to the first condenser 3a, which has its outlet side connected via a second high pressure side steam duct 6c to a jacket 10 of the steam compressor 2. The jacket 10 has its outlet side connected to the second condenser 3b.

With this compressor temperature preserving means, steam partly liquified in the first condenser 3a is led to the jacket 10 of the compressor 2 to cool a main part thereof, and then condensed in the second condenser 3b. When the steam compressor 2 is over-heated, material damage will be caused. When it is over-cooled, on the other hand, water in it will be condensed and may destroy it as a result of liquid compression. The compressor temperature preserving means can hold the steam compressor at an adequate temperature and eliminate the drawback discussed above. Further, waste heat of the steam compressor 2 can be utilized for the evaporation of water in the vacuum tank 1.

As steam exhausting means, a steam vent valve 11 is provided on a duct branching from the first high pressure side steam duct 6b. When the temperature of the steam in this system is excessively increased, the valve 11 may be opened to discard part of the steam and thus lower the temperature.

As flash steam returning means, a flash steam separator 12a is provided at the condensation water exhausting port of the steam trap 5, and is connected via a gas purger 12b to the vacuum tank 1. Thus, condensation water exhausted from the steam trap 5 is reduced in pressure, whereby flash steam is generated, which is separated in the flash steam separator 12a and returned to the tank 1 for heat recovery.

An auxiliary heater 13 is provided in the vacuum tank 1. The auxiliary heater 13 is heated electrically or by steam to accelerate the temperature rise at the time of the start.

A stirrer 14 is provided in the vacuum tank 1. The stirrer 14 stirs the waste W to promote heat transfer thereof with the steam condenser 3, and then the waste is further stirred.

A thermic bend 15 is provided in parallel with the relief valve 4. Thus, non-condensing gas, i.e., air, can be exhausted under a pressure below the operating pressure of the relief valve 4.

Where this embodiment processes a solid waste, by mixing oil therewith, the interstices in the waste may be filled, and the heat transfer performance can be improved. Where the waste is burned in an after-process to utilize heat for power generation or like purposes, the addition of oil gives rise to no problem. The oil to be added may be waste oil resulting from edible oil or mineral oil, and a waste oil processing may be simultaneously carried out. This vacuum dryer may further be used in the case of processing waste food, such as waste fish, meat or vegetables, by frying for producing forage or the like by post processing fat removal.

Figure 4:
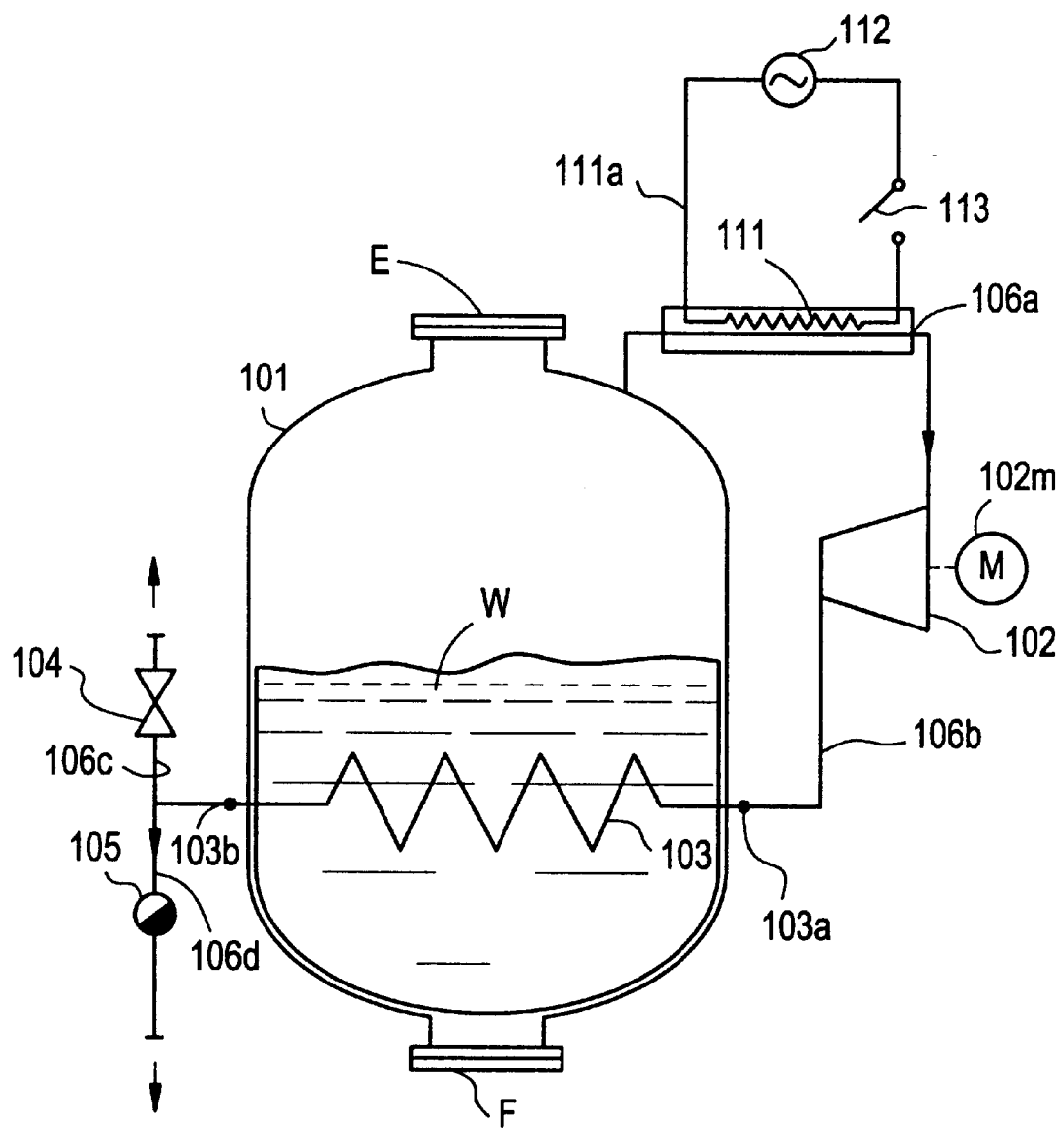
FIG. 4 is a schematic view showing the constitution of a further embodiment of the present invention.
Figure 5:
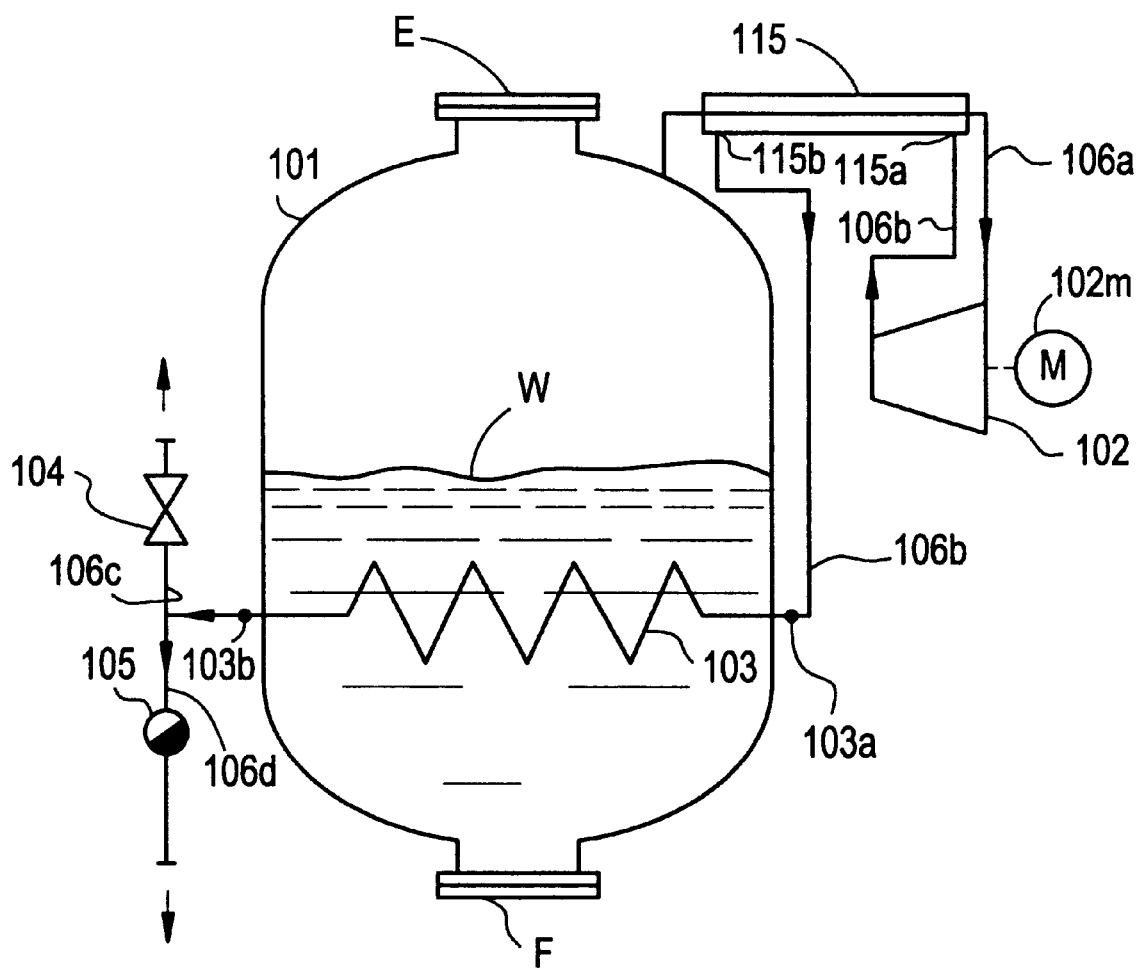
FIG. 5 is a schematic view showing the constitution of a still further embodiment of the present invention.

In the embodiment described before in connection with FIGS. 1–3, as steam passes through the low pressure side steam duct 6a to the steam compressor 2, it may be cooled and partly liquified into fine drops, which may be evaporated again when they are sucked into the cylinders of steam compressor 2 and thus reduce the volume efficiency thereof. FIGS. 4 and 5 show embodiments, which can prevent liquification of steam and super-heat the steam when sucked into the steam compressor.

In the embodiment shown in FIG. 4, a vacuum tank 101, into which a water-containing waste W is charged, accommodates a condenser 103 disposed in it. The condenser 103 has one end 103a connected via a steam duct 106b to a steam compressor 102 and the other end connected via a gas duct 106c to a relief valve 104 for exhausting non-condensing gas and also via a draining duct 106d to a steam trap 105 for draining condensation water.

The steam compressor 102 is driven by an electric motor 102m, and is connected via a suction duct 106a to the vacuum tank 101. A heater coil 111 is wound as a steam heater on the suction duct 106a, and is connected via a switch 113 to a power source 112.

Reference symbol E designates a waste inlet opening, and reference symbol F designates a waste outlet opening.

Operation of the embodiment shown in FIG. 4 will now be described.

In operation, when the operation of the vacuum dryer is started by turning-on the motor 102m of the steam compressor 102, steam is generated in the vacuum tank 101. Since the steam generated is saturated, saturated steam is sucked through the suction duct 106a. However, by turning on the switch 113 of the coil heater 111 of the suction duct 106a, the suction duct 106a is heated by the heater. Steam being sucked is thus heated and prevented from existing in a wet state. Heating the suction duct beyond the saturation temperature, however, will cause undesired over-heating (or super-heating) of the steam being sucked.

By making the suction duct 106a as short as possible and heat-insulting the duct from the outside, the capacity of the heat source can be reduced.

In the embodiment shown in FIG. 5, a heat exchanger 115 is provided in place of the electric heater (i.e., coil heater) 111 in the preceding embodiment shown in FIG. 4. More specifically, the steam duct 106b on the discharge side of the steam compressor 102 is connected to one end 115a of the heat exchanger 115, which is a double-wall type heat exchanger provided on the suction duct 106a led to the steam compressor 102. The other end 115b of the heat exchanger 115 is connected to one end 103a of the condenser 103. For the remainder of the construction, the embodiment is the same as the embodiment shown in FIG. 4.

In this embodiment no separate heat source need be provided, thus readily permitting inspection and maintenance and reducing running expenditures.

The heat exchanger is not limited to the double-wall type; for instance, a shell-and-tube type may be used, and a heat exchanger requiring short tubing from the layout may be selected.

It was experimentarily confirmed that the volumetric efficiency of the steam compressor can be improved by heating the suction duct.

Where waste in a vacuum tank is heated by using the steam recompression technique, preheating the inside of the tank with steam has a very satisfactory effect as described before. In embodiments of the invention shown in FIGS. 6 to 10, steam is supplied from steam generating means to a vacuum tank.

Figure 6:
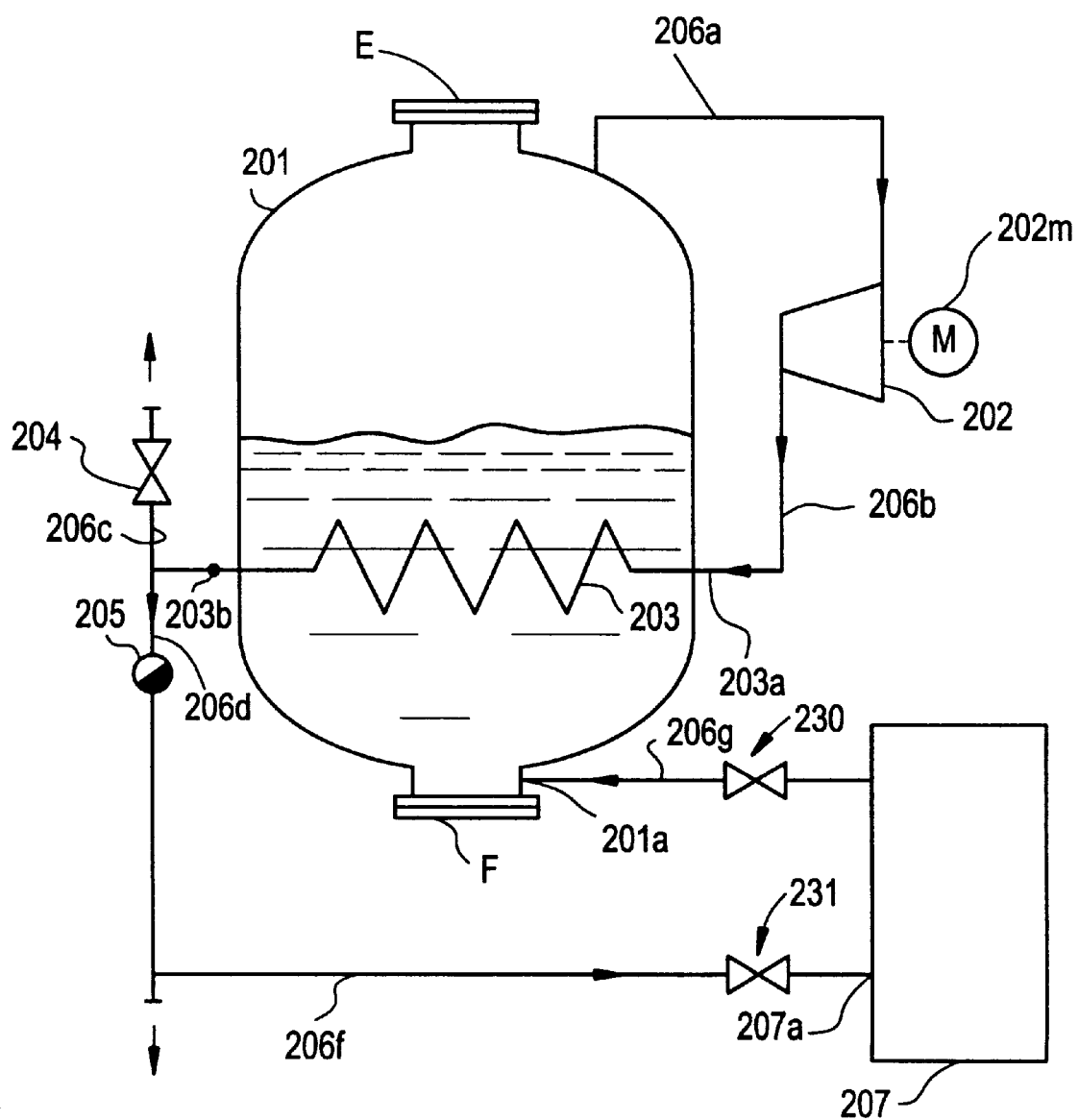
FIG. 6 is a schematic view showing the constitution of a yet further embodiment of the present invention.

In the embodiment shown in FIG. 6, a water-containing waste is charged into a vacuum tank 201, which has its outer surface covered by a heat insulating material (not shown). A condenser 203 is disposed in the tank 201. The condenser 203 has one end 203a connected via a steam duct 206b to a steam compressor 202 and the other end 203b connected via a steam duct 206c to a relief valve 204 for exhausting non-condensible gas and also via a steam duct 206d to a steam trap 205 for draining condensation water.

A suction duct 206a of a compressor 202 driven by an electric motor 202m, is connected to the vacuum tank 201.

A steam boiler 207, which is a steam generating means and has a well-known construction, has its discharge port connected via a steam duct 206g and an automatic valve 230 provided thereon to a bottom part 201a of the vacuum tank 201. A water replenishment duct 206f, which is led downstream from the steam trap 205 provided on the steam duct 206d, is connected via an automatic valve 231 to a replenishment port 207a of the steam boiler 207.

Reference symbol E designates a waste inlet port, and reference symbol F designates a waste outlet port.

The function of the embodiment shown in FIG. 6 will now be described.

In operation, a waste W is charged into a vacuum tank 201, and heated by supplying steam from the steam boiler 207 through the automatic valve 230 into the tank 201. Then the temperature of the waste is increased to 75° C., for instance, the steam compressor 202 is started. When a predetermined temperature (for instance 90° C.) is reached inside the tank the boiler 207 is stopped, while the steam compressor 202 is continually operated. When the tank inside temperature is lowered, the boiler 207 may be started again for heating.

Because the tank 201 can be elevated in temperature in a short period of time by supplying steam to it, sufficiently efficient operation is thus possible with a small size compressor.

In the embodiment shown in FIG. 6, the condenser 203 is disposed in the tank 201, thus it is difficult to dispose a stirrer in the tank. Therefore, it is suited for processing waste not needing stirring, such as liquid waste concentration.

Figure 7:
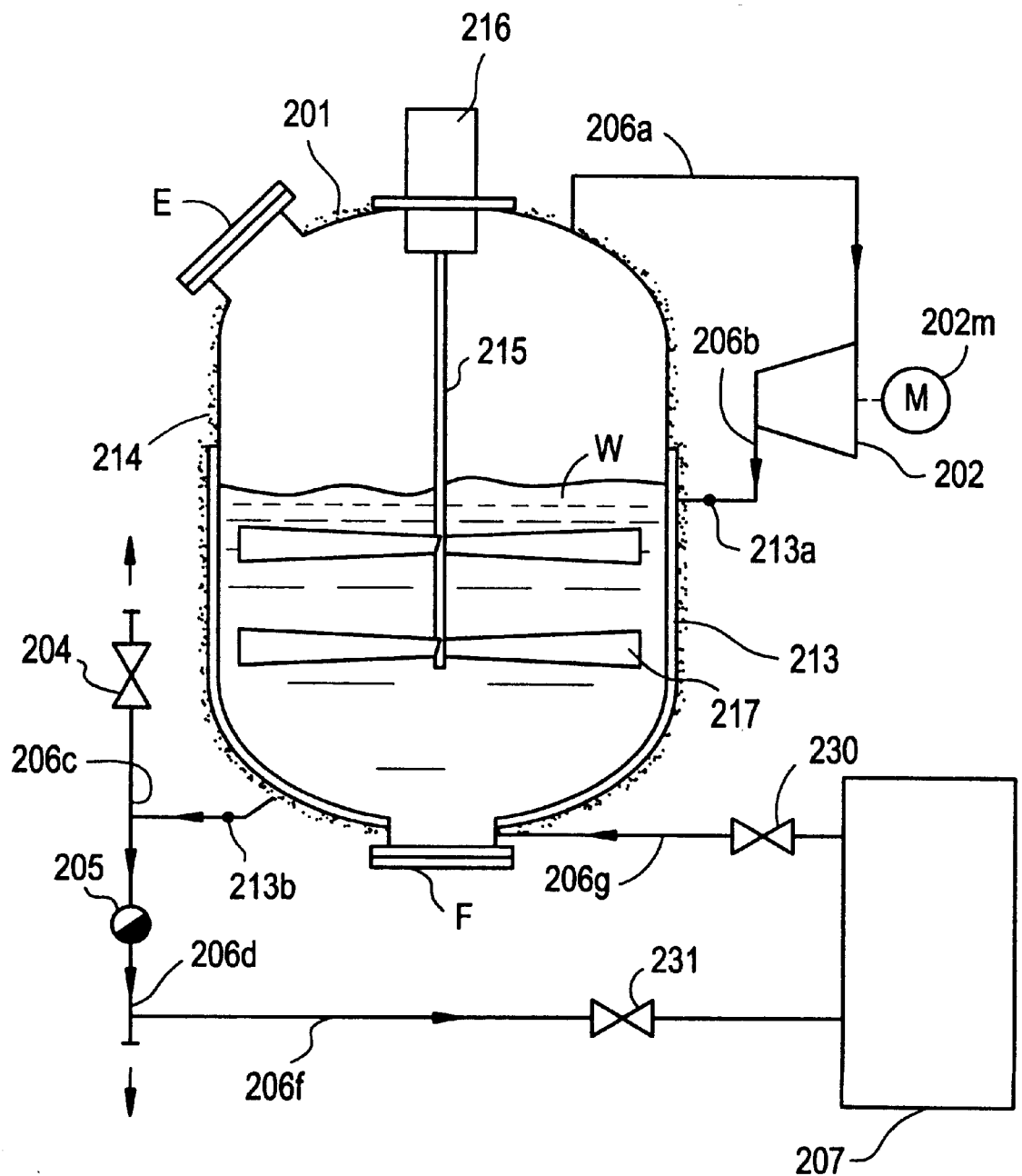
FIG. 7 is a schematic view showing the constitution of a yet another embodiment of the present invention.

In the embodiment shown in FIG. 7, the tank 201 has a condenser 213 integral with the outer surface of its double-wall lower portion, and accommodates a stirrer 215 disposed in it. For the remainder of the construction, the embodiment is the same as the preceding embodiment shown in FIG. 6.

The condenser 213 provided on the tank lower portion outer surface, has an inlet portion 213a connected via the steam duct 206b to the compressor 202 and an outlet portion 213b connected to the duct 206c. A geared motor 216 having a well-known construction, for driving blades 217 of the stirrer 215, is mounted on the top center of the tank 201. The waste charging inlet E is disposed at a position other than the position of the motor 216. Reference numeral 214 designates a heat-insulating material.

In the embodiment shown in FIG. 7, the condenser 213 does not interfere with the operation of the stirrer 215. The embodiment is thus suited for processing highly viscous wastes containing solid matter and requiring the stirrer 215.

Figure 8:
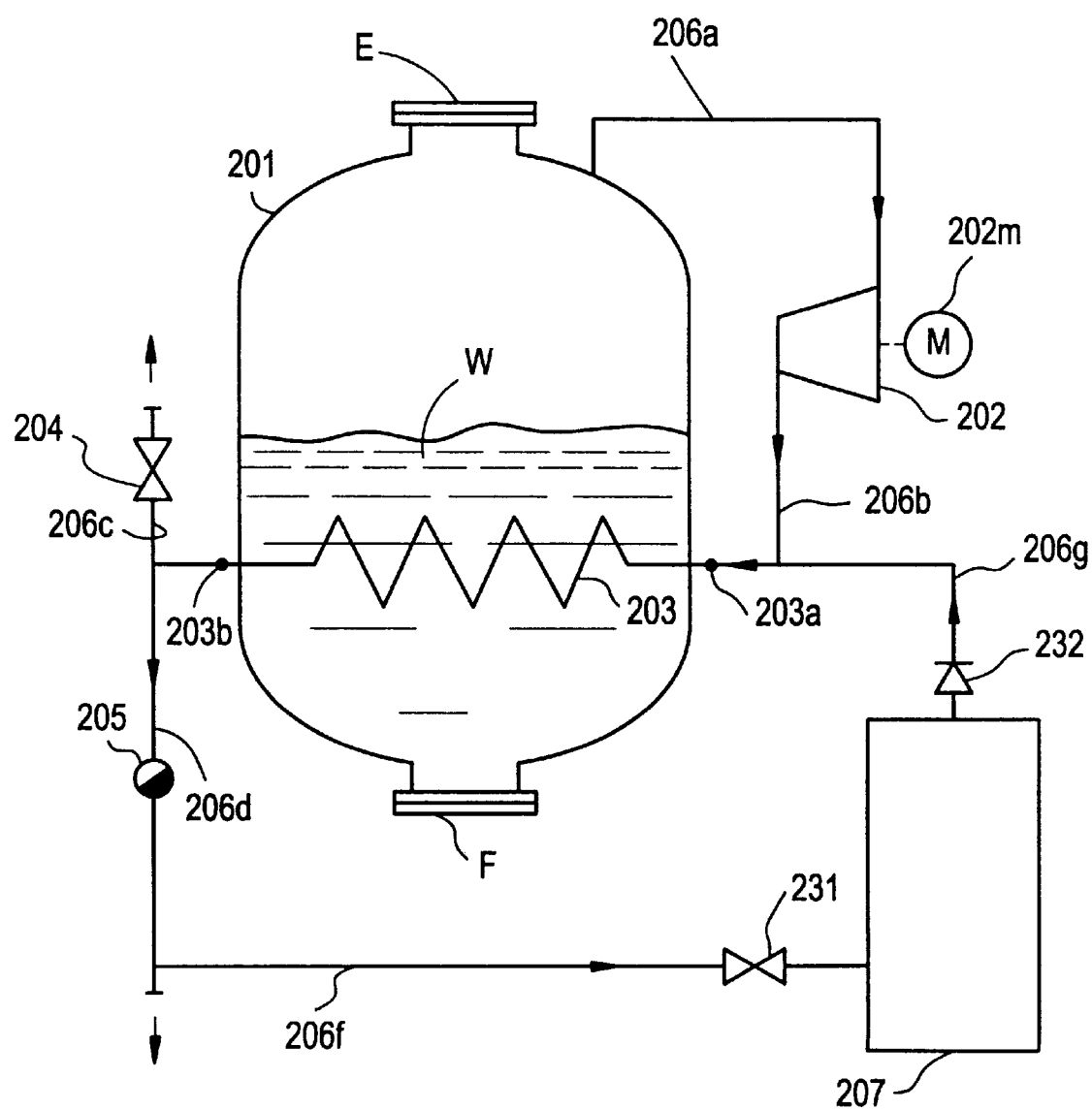
FIG. 8 is a schematic view showing the constitution of a further embodiment of the present invention.

The embodiment shown in FIG. 8 is the same as the embodiment shown in FIG. 6 except for that the discharge side of the steam boiler 207 is connected via a check valve 232 to the discharge side duct 206b leading from the compressor 202 to the condenser 203.

In the embodiment shown in FIG. 6, steam entered the vacuum tank 201 to heat the waste. In the embodiment shown in FIG. 8, steam for heating the waste does not enter the tank 201 but is passed through the condenser 203. This is advantageous in that water in the tank is not increased.

Figure 9:
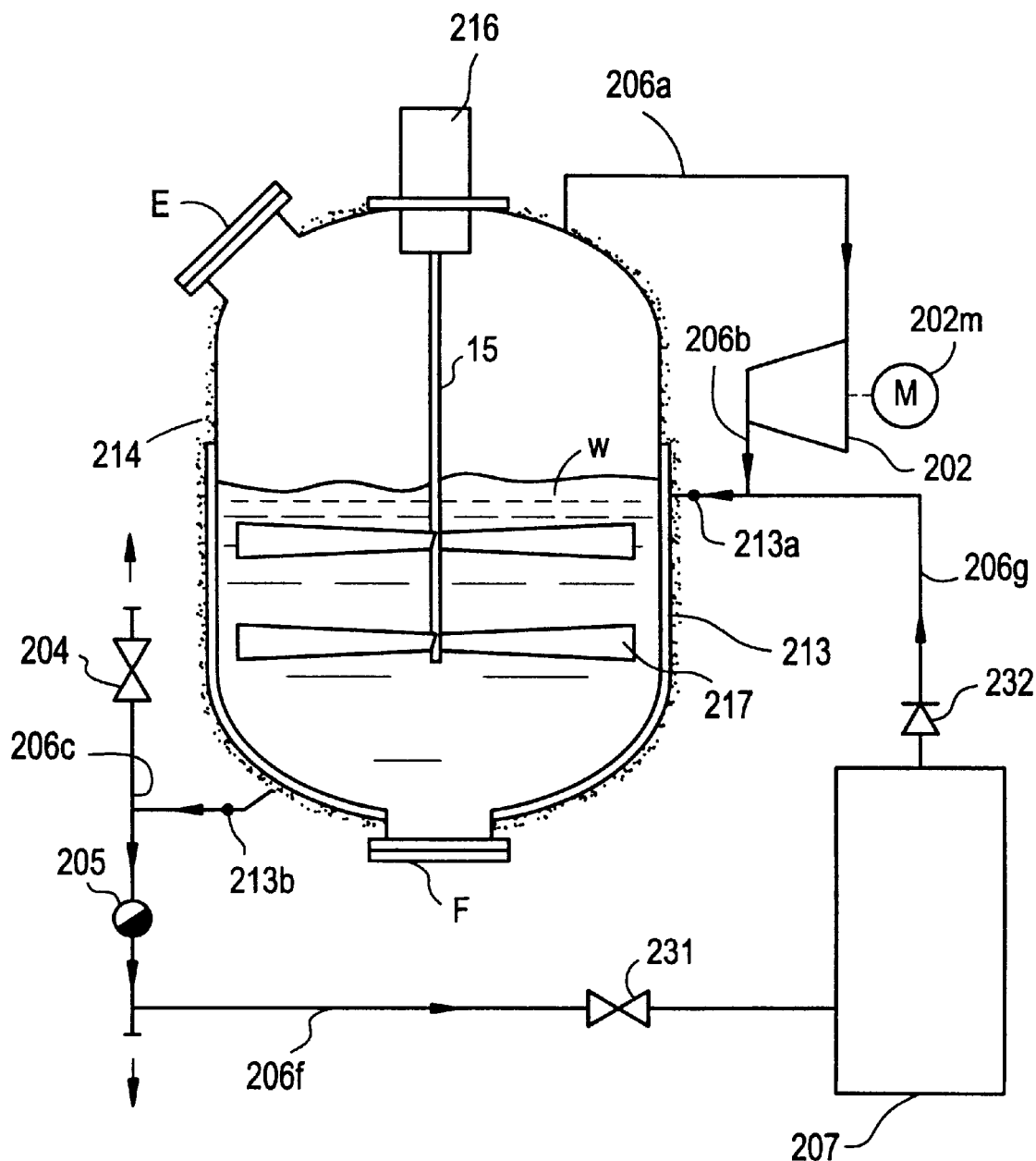
FIG. 9 is a schematic view showing the constitution of a further embodiment of the present invention.

The embodiment shown in FIG. 9 is different from the embodiments shown in FIGS. 6–8. The embodiment shown in FIG. 9 is the same as the embodiment shown in FIG. 7 except for that like the embodiment shown in FIG. 6 the discharge side of the steam boiler 207 is connected via a check valve 232 to the discharge side steam duct 206b led from the steam compressor 202 to the condenser 213. With this constitution, the same function and effect are obtainable as in the case of providing a stirrer in the embodiment shown in FIG. 7. The check valve 232 is provided to prevent steam from the steam compressor 202 from entering the boiler.

Figure 10:
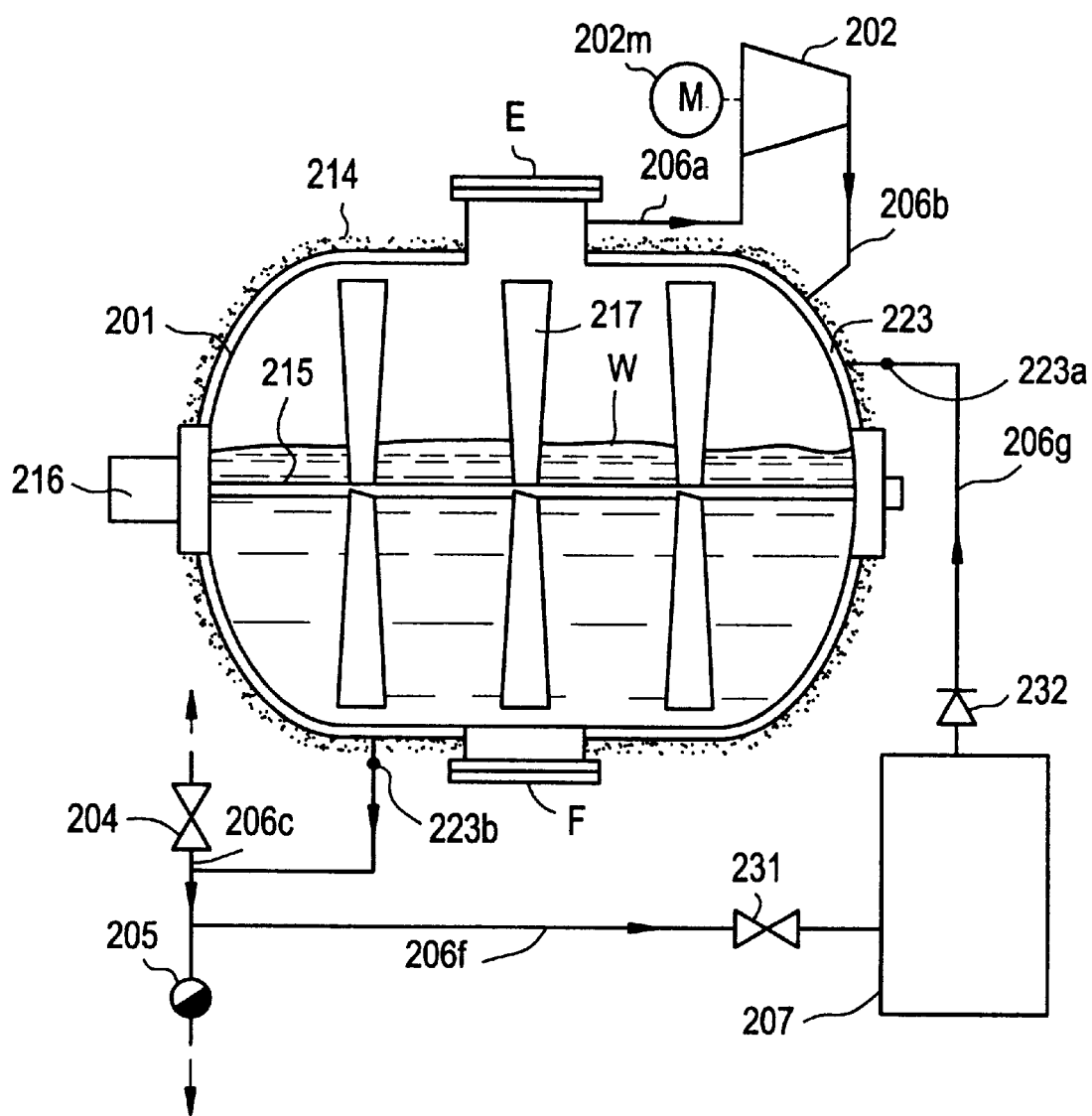
FIG. 10 is a schematic view showing the constitution of a further embodiment of the present invention.

In the embodiment shown in FIG. 10, the vacuum tank 201 has a double-wall structure constituting a condenser 223. This vacuum dryer is of horizontal type, with its stirrer 215 having a horizontal shaft. The steam duct 206g of the steam boiler 207 and the steam duct 206b of the steam compressor 202 are connected to the double-wall type condenser 223. Like the embodiment shown in FIG. 9, the steam ducts 206g and 206b may be joined together to be connected to the double-wall type condenser 223.

The embodiment shown in FIG. 10 has advantages in that it can readily stir rubbish or like waste and that it can raise temperature uniformly and quickly. The embodiment may be selected in dependence on the kind or content of the waste.

ADVANTAGES OF THE INVENTION

As has been described in the foregoing, according to the invention the following excellent advantages are obtainable.

(1) High operation efficiency is obtainable, permitting great energy saving in a drying or concentrating process.

(2The construction is simple with less auxiliary parts. Thus, the cost of manufacture is low, and the maintenance is easy and/or ready.

(3) Electric power can be utilized to permit easy (and/or ready) operation.

(4) Size reduction is possible.

(5) Waste water treatment and smell removal are easy (and/or ready)

(6) Since fire is not used, wastes containing combustible materials such as alcohols can be safely dried.

(7) With the above advantages, it is possible to promote recycling and adequate treatment of wastes.

By arranging that saturated steam in the vacuum tank is heated by the sucked gas duct of the compressor:

(8) It is possible to eliminate the wet state of steam and obtain overheating (or superheating), so that it is possible to make full use of the compressor.

Moreover, by arranging such that the vacuum tank inside is preheated by steam, the following advantages are obtainable.

(9) Tastes can be efficiently heated directly or indirectly by steam from the steam boiler.

(10) It is possible to select the heat source of the boiler, and pre-heating may be done in a shorter time by selecting a heat source having a high heating capacity.

(11) It is possible to dispense with a soft water generator by partly using condensation water as replenishment water of the steam boiler.

(12) It is possible to obtain ready installation of the stirrer and increase the freedom of selection of the stirrer.

(13) It is possible to reduce the capacity of the compressor, which contributes to the size and weight reduction of the system.

I claim:

1. A steam re-compression vacuum dryer comprising: a vacuum tank for accommodating a waste; a first steam duct for removing steam from the vacuum tank; a steam compressor for compressing steam removed from said vacuum tank via said first steam duct and for producing a vacuum pressure in said vacuum tank; a steam condenser disposed in and thermally coupled to said vacuum tank for condensing at least a portion of the compressed steam; non-condensing gas exhausting means for automatically exhausting non-condensing gas from said steam condenser; and condensation water exhausting means for automatically exhausting condensation water from said steam condenser.

2. The steam re-compression vacuum dryer according to claim 1, which further comprises compressor temperature preserving means for holding said steam compressor at a predetermined temperature.

3. The steam re-compression vacuum dryer according to one of claims 1 or 2, which further comprises a second steam duct connecting the steam compressor to the steam condenser; and steam exhausting means for exhausting steam from the second steam duct to an area outside the second steam duct in order to lower a temperature of the steam remaining in the vacuum dryer.

4. The steam re-compression vacuum dryer according to one of claims 1 or 2, which further comprises flash steam returning means coupled to said condensation water exhausting means, for separating flash steam from the condensation water and returning the separated flash steam to said vacuum tank.

5. A steam re-compression vacuum dryer comprising: a vacuum tank for accommodating a waste; a first steam duct for removing steam from the vacuum tank; a steam compressor for compressing steam removed from said vacuum tank via said first steam duct and for producing a vacuum pressure in said vacuum tank; a steam condenser disposed in and thermally coupled to said vacuum tank for condensing at least a portion of the compressed steam; non-condensing gas exhausting means for automatically exhausting non-condensing gas from said steam condenser; condensation water exhausting means for automatically exhausting condensation water from said steam condenser; and a gas heater provided on the first steam duct in order to heat gas withdrawn through the first steam duct.

6. The steam re-compression vacuum dryer according to claim 5, wherein said gas heater is an electric heater provided on said first steam duct.

7. The steam re-compression vacuum dryer according to claim 5, wherein said gas heater is a heat exchanger provided on said first steam duct, and wherein the heat exchanger uses steam discharged from said steam compressor as a heat source.

8. A steam re-compression vacuum dryer comprising: a vacuum tank for accommodating a waste; a first steam duct for removing steam from the vacuum tank; compressing means for compressing steam removed from said vacuum tank via said first steam duct and for producing a vacuum pressure in said vacuum tank; steam condensing means thermally coupled to said vacuum tank for condensing at least a portion of the compressed steam; exhausting means for exhausting condensation water and non-condensing gas; and steam generating means disposed outside said vacuum tank, wherein a discharge side of said steam generating means is connected to said vacuum tank.

9. A steam re-compression vacuum dryer comprising: a vacuum tank for accommodating a waste; compressing means for compressing steam from said vacuum tank; steam condensing means thermally coupled to said vacuum tank; exhausting means for exhausting condensation water and non-condensing gas; and steam generating means disposed outside said vacuum tank, wherein a discharge side of said steam generating means is connected together with a discharge side of said compressing means to said steam condensing means, and wherein an outlet side of said steam condensing means is connected to said exhausting means.

10. The steam re-compression vacuum dryer according to one of claims 8 or 9, wherein said steam condensing means is disposed in said vacuum tank.

11. The steam re-compression vacuum dryer according to one of claims 8 or 9, wherein said steam condensing means is integral with an outer surface of said vacuum tank, and a stirrer is disposed in said vacuum tank.

12. The steam re-compression vacuum dryer according to one of claims 8 or 9, wherein said vacuum tank includes a double-wall type condenser that serves as said steam condensing means, and a stirrer is disposed in said vacuum tank.

13. The steam re-compression vacuum dryer according to one of claims 8 or 9, wherein said condensation water is supplied to said steam generating means.

* * * * *